(12) United States Patent
Hiramoto et al.

(10) Patent No.: US 8,782,900 B2
(45) Date of Patent: Jul. 22, 2014

(54) METHOD OF MANUFACTURING ROTATING DEVICE AND ROTATING DEVICE

(75) Inventors: Yukihiro Hiramoto, Yaizu (JP); Noboru Masuda, Fujieda (JP)

(73) Assignee: Samsung Electro-Mechanics Japan Advanced Technology Co., Ltd., Fujieda, Shizuoka Prefecture (JP)

( * ) Notice: Subject to any disclaimer, the term of this patent is extended or adjusted under 35 U.S.C. 154(b) by 448 days.

(21) Appl. No.: 13/190,665

(22) Filed: Jul. 26, 2011

(65) Prior Publication Data

US 2012/0047710 A1 Mar. 1, 2012

(30) Foreign Application Priority Data

Aug. 26, 2010 (JP) ................................. 2010-189039

(51) Int. Cl.
 *B21D 53/10* (2006.01)

(52) U.S. Cl.
 USPC ..... 29/898.02; 29/898; 29/898.07; 29/603.03

(58) Field of Classification Search
 CPC .... F16C 35/067; F16C 35/077; G11B 5/4813
 USPC ...................... 29/898, 898.02, 898.07, 603.03
 See application file for complete search history.

(56) References Cited

U.S. PATENT DOCUMENTS 4,778,315 A * 10/1988 Duffy et al. ................... 409/136
5,317,462 A * 5/1994 Kakizaki et al. ........... 360/99.16
6,694,617 B2 * 2/2004 Gredinberg et al. ........ 29/898.02
6,952,875 B2 * 10/2005 Dorulla et al. ............. 29/898.02
2010/0254043 A1 10/2010 Nishihara
2011/0063964 A1 3/2011 Omura et al.

FOREIGN PATENT DOCUMENTS

| JP | 2-28786 U | 2/1990 |
| JP | 07-124529 A | 5/1995 |
| JP | 2007-90484 A | 4/2007 |
| JP | 2009-176369 A | 8/2009 |
| JP | 2010-244627 A | 10/2010 |
| JP | 2011-123984 A | 6/2011 |

OTHER PUBLICATIONS

Japanese Office Action dated Apr. 1, 2014 (and English translation thereof) issued in counterpart Japanese Application No. 2010-189039.

* cited by examiner

*Primary Examiner* — Richard Chang
(74) *Attorney, Agent, or Firm* — Holtz Holtz Goodman & Chick PC

(57) ABSTRACT

A manufacturing method of a rotating device includes a first machining process of machining a bearing hole while supplying a first cutting lubricant to a base member, a second machining process continuous from the first machining process, the second machining process being of machining a tap hole while supplying a second cutting lubricant to the base member, a blowing process of blowing at least either one of the bearing hole and the tap hole with a fluid in order to eliminate a machining residue, the blowing process including an air spraying process and a liquid spraying process, a cleaning process of cleaning the base member, and an assembling process of assembling the base member with the bearing unit and the rotating body.

20 Claims, 11 Drawing Sheets

METHOD OF MANUFACTURING ROTATING DEVICE AND ROTATING DEVICE

CROSS-REFERENCE TO RELATED APPLICATION

This application claims the benefit of Japanese Patent Application No. 2010-189039 filed on Aug. 26, 2010, the entire disclosure of which is herein incorporated by reference.

BACKGROUND OF THE INVENTION

1. Field of the Invention

The present invention relates to a method of manufacturing a rotating device and a rotating device, and more specifically, a technology that improves the level of cleanness of a component part of the rotating device, thereby improving the product quality.

2. Description of the Related Art

Recently, the rotational accuracy of rotating devices like HDDs has been remarkably improved by causing those devices to have a fluid dynamic bearing unit. Together with such an improvement, rotating devices like HDDs are required to have a higher density and a more increased capacity. For example, an HDD that magnetically records data rotates a recording disk formed with recording tracks at a high speed, and executes a read-write operation of data while allowing a magnetic head to trace the recording tracks with a slight flying height therebetween. In order to cause such an HDD to have a high density and an increased capacity, it is necessary to make the width of recording track narrowed. Together with narrowing of the track width, it becomes necessary to make a space between the magnetic head and the recording disk further narrowed. There is a requisition to cause the flying height between the magnetic head and the recording disk to be extremely narrow which is equal to or smaller than, for example, 10 nm in consideration of the read-write reliability of data.

In order to accomplish the high density, magneto-resistance effect devices (hereinafter, referred to as MR devices) are frequently used for the magnetic head. Conversely, the use of the MR devices in an extremely narrow flying height brings about a serious problem which is the occurrence of thermal asperity failure (hereinafter, referred to as a TA failure) and a head crash failure. Momentary heat is generated in the MR device by kinetic energy originating from minute foreign substances on the disk surface contacting the MR device while the magnetic head is flying and tracing the recording tracks. The TA failure causes the resistance of the MR device to momentarily fluctuate and be superimposed on a reproduction signal as noises when the MR device is momentarily heated and cooled, and thus reducing the reading accuracy of the reproduction signal. The inventors of the present invention keenly studied and learned that TA failure is caused by foreign substances (hereinafter, referred to as particles) originally adhering to a rotating device and having a size of 0.1 μm to several μm or so which stick to the recording disk surface due to vibration, air flow, and the like.

Meanwhile, the rotating device includes an assembly that has a base member, a bearing unit on the base member and including a sleeve and a shaft rotatable relative to the sleeve, and a rotating body that is rotatably supported on the base member by the bearing unit. A recording disk is mounted on a hub member that is a part of the rotating body, and the rotating device is thus manufactured which includes a magnetic head, a drive device thereof, a control circuit and other necessary components.

In the case of rotating devices, an example cause of producing particles is that the rotating device is assembled with cutting and a cutting lubricant produced when the base member is machined being adhering to the base member as it is.

The base member includes a bearing hole where the bearing unit is attached, a tap hole for attaching a cover to the outer wall of the base member by means of a screw, and another tap hole for fastening the rotating device to another device by means of a screw, and the like. Such a base member is cleaned after the bearing hole and the tap holes are formed, and then the bearing unit and the rotating body are assembled therewith. Conventionally, a manufacturing method of such a rotating device is executed through a so-called batch scheme that independently executes a process of forming the bearing hole in the base member, a process of forming the tap holes in the base member, a process of cleaning the base member and a process of assembling the bearing unit and the rotating body with the base member. It is typical that intermediate products are stored before and after each process according to the batch-scheme manufacturing method. When the intermediate products are stored, the intermediate products may be scratched or particles may stick thereto during storing. Moreover, when a cutting lubricant is used in the process of forming the bearing hole and the tap holes, such a lubricant may be dried and solidified while the intermediate products are stored. Once the cutting lubricant becomes solidified, elimination thereof is not easy and the lubricant remains on the base member without such a lubricant being eliminated sufficiently, and the remaining lubricant may become particles.

Conventionally, the base member is assembled together through a cleaning process of eliminating particles like dust with the aid of, for example, ultrasound in a cleaning tank filled with a predetermined cleaning liquid. Regarding the cleaning process, a so-called batch cleaning is popular in which base members in a unit of several tens are put in a cleaning basket and soaked in the cleaning liquid. Such a cleaning process is often applied when small components are mass-produced. According to the batch cleaning, the base members are dried after cleaning together with the cleaning basket, and are stored in a storage like a warehouse. Next, in the assembling process, the stored base members are taken out and supplied to an assembling line, and thus a rotating device is assembled (see, for example, JP H07-124529 A).

According to the above-explained manufacturing method of executing in a batch scheme the process of forming the bearing hole in the base member, the process of forming tap holes in the base member, and the process of cleaning the base members, in general, the level of cleanness as a whole by the cleaning process is low. For example, the level of cleanness of a rotating device is evaluated based on the number of particles having a size of equal to or larger than 0.5 μm and present per 1 cm² (hereinafter, referred to as an LPC). The LPC is obtained through the following procedures. That is, a test object is soaked in a tank filled with, for example, 2000 cc of pure water, is irradiated with ultrasound of 98 w at 68 kHz for 120 seconds, and the number of particles present in the pure water is counted using a liquid particle counter like CLS-700 or LS200 made by Particle Measuring Systems, Inc., U.S.A.

Moreover, according to the conventional manufacturing method of executing in a batch scheme the process of forming the bearing hole in the base member, the process of forming the tap holes in the base member, and the process of cleaning the base members, when it is attempted to obtain a desired cleanness level, cleaning takes a long time and the working efficiency is poor. Moreover, after cleaning, particles floating in air may stick to the base member which is being stored in a warehouse. When many particles remain on the base member in this fashion, if the flying height of the magnetic head is reduced, the occurrence rate of TA failure becomes high, which disturbs accomplishment of the higher density of the rotating device and the increased capacity thereof. Hence, a process of wiping out particles using a solvent like hexane may be possibly added before and after assembling. However, it brings about reduction of the manufacturing efficiency and in many cases, elimination of the particles through the wiping process is insufficient.

The present invention has been made in order to overcome the problem explained above, and it is an object of the present invention to provide a technique of improving the cleanness level of each component of a rotating device and of maintaining the probability of occurrence of a TA failure at low even if the flying height of a magnetic head is reduced.

SUMMARY OF THE INVENTION

In order to achieve the above object, a first aspect of the present invention provides a method of manufacturing a rotating device that includes a base member in which a bearing hole and a tap hole are to be formed, a bearing unit to be inserted in the bearing hole, and a rotating body to be supported by the bearing unit, the method including: a first machining process of machining the bearing hole while supplying a first cutting lubricant to the base member; a second machining process continuous from the first machining process, the second machining process being of machining the tap hole while supplying a second cutting lubricant to the base member; a blowing process of blowing at least either one of the bearing hole and the tap hole with a fluid in order to eliminate a machining residue; a cleaning process of cleaning the base member; and an assembling process of assembling the base member with the bearing unit and the rotating body.

According to this configuration, the second machining process is successively executed from the first machining process, so that the second machining process is executed which machines the tap hole while supplying the second cutting lubricant before the first cutting lubricant supplied to the base member in the first machining process is dried and solidified. In this case, the machining residue like cutting can be eliminated together with the first cutting lubricant and the second cutting lubricant in the blowing process before the first and second cutting lubricants are dried. As a result, the cleanness level of the base member is improved, and even if the flying height of a magnetic head is reduced, the occurrence possibility of a TA failure can be reduced.

In order to achieve the above object, a second aspect of the present invention provides a method of manufacturing a rotating device including a base member in which a bearing hole and a tap hole are to be formed, a bearing unit to be inserted in the bearing hole, and a rotating body to be supported by the bearing unit, the method including: a first machining process of machining the bearing hole while supplying a first cutting lubricant to the base member; and a second machining process of machining the tap hole while supplying a second cutting lubricant to the base member, wherein the second machining process is executed while a moistening of the first cutting lubricant adhered to the base member after a machining through the first machining process is equal to or higher than a predetermined reference value.

In order to achieve the above object, a third aspect of the present invention provides a rotating device manufactured through the manufacturing method of the first aspect of the present invention.

An arbitrary combination of the above-explained elements and a replacement of the elements and expressions of the present invention one another are also effective as an embodiment of the present invention.

BRIEF DESCRIPTION OF THE DRAWINGS

A more complete understanding of this application can be obtained when the following detailed description is considered in conjunction with the following drawings, in which.

DETAILED DESCRIPTION OF THE PREFERRED EMBODIMENT

Figure 1:
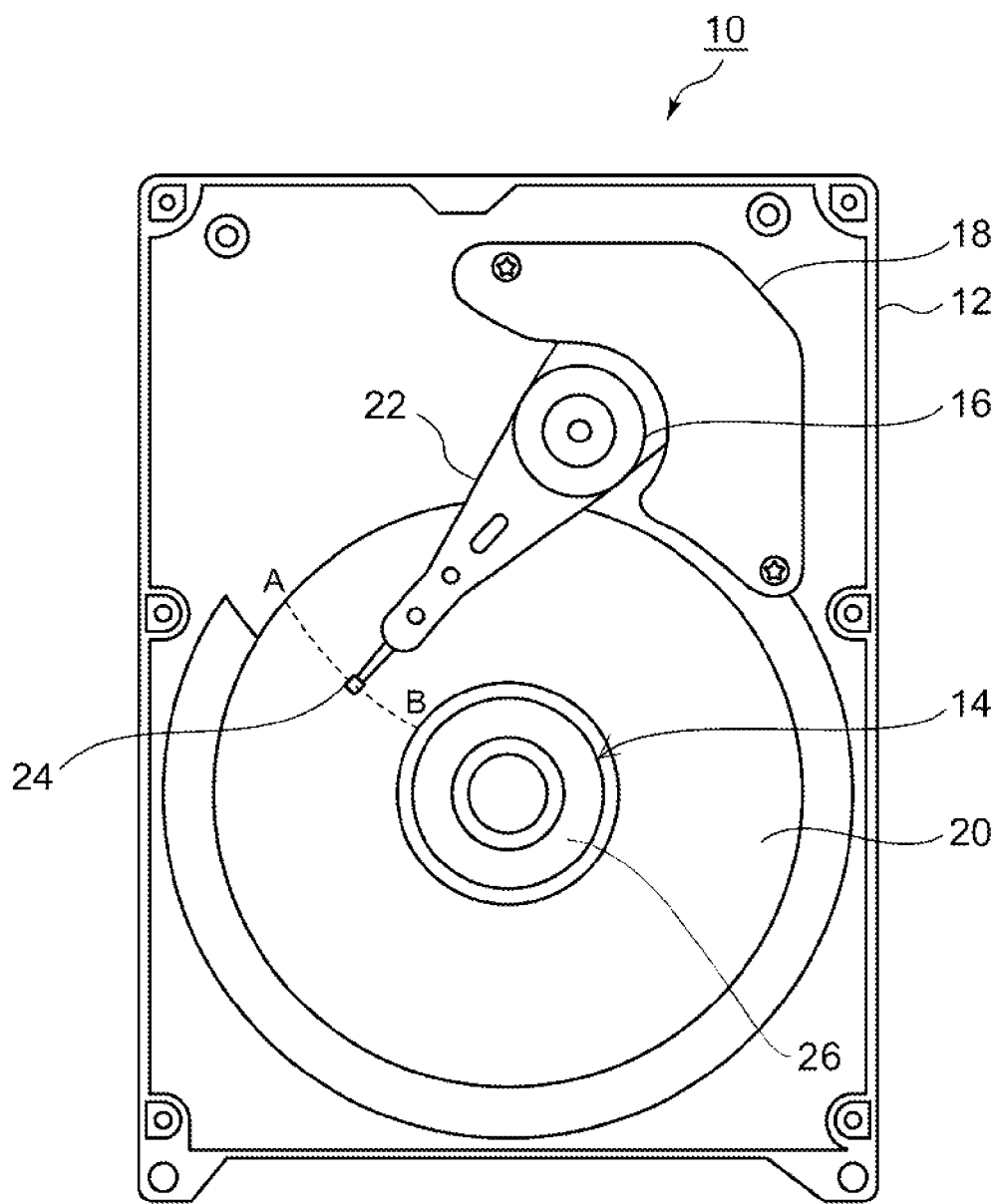
FIG. 1 is an explanatory diagram of an internal configuration of a disk drive device (HDD) that is an illustrative rotating device manufactured through a manufacturing method according to an embodiment of the present invention.

An explanation will be given of an embodiment of the present invention with reference to the accompanying drawings. FIG. 1 is an explanatory diagram of an internal configuration of a hard disk drive device (HDD) that is an illustrative rotating device 10 manufactured through a manufacturing method of the embodiment. FIG. 1 illustrates a state in which a cover is removed in order to expose the internal configuration.

Mounted on the top face of a base member 12 are a brushless motor 14, an arm bearing unit 16, a voice coil motor 18, and the like. The brushless motor 14 supports, on the rotation axis thereof, a hub member 26 for mounting a recording disk 20 which can magnetically record data, and rotates and drives the recording disk 20. An illustrative brushless motor 14 is a spindle motor. The brushless motor 14 rotates and drives the recording disk 20. The brushless motor 14 is driven by a three-phase drive current that is in a U phase, a V phase and a W phase. The arm bearing unit 16 supports, in a swingable manner, a swing arm 22 within a movable range AB. The voice coil motor 18 swings the swing arm 22 in accordance with control data from the exterior. A magnetic head 24 is attached to a tip of the swing arm 22. When the rotating device 10 is in operation, the magnetic head 24 moves, together with a swing of the swing arm 22 within the movable range AB, above the surface of the recording disk 20 with a slight gap therefrom, and reads/writes data. In FIG. 1, a point A corresponds to a location of the outermost circumference recording track of the recording disk 20, and a point B corresponds to a location of the innermost circumference recording track thereof. The swing arm 22 may move to a retract position provided at a side of the recording disk 20 when the rotating device 10 is in a halt state.

In the present embodiment, one which includes all configurations of reading/writing data, such as the recording disk 20, the swing arm 22, the magnetic head 24, and the voice coil motor 18, is sometimes referred to as a rotating device, or an HDD. Alternatively, only components that rotate and drive the recording disk 20 may be referred to as a rotating device.

Figure 2:
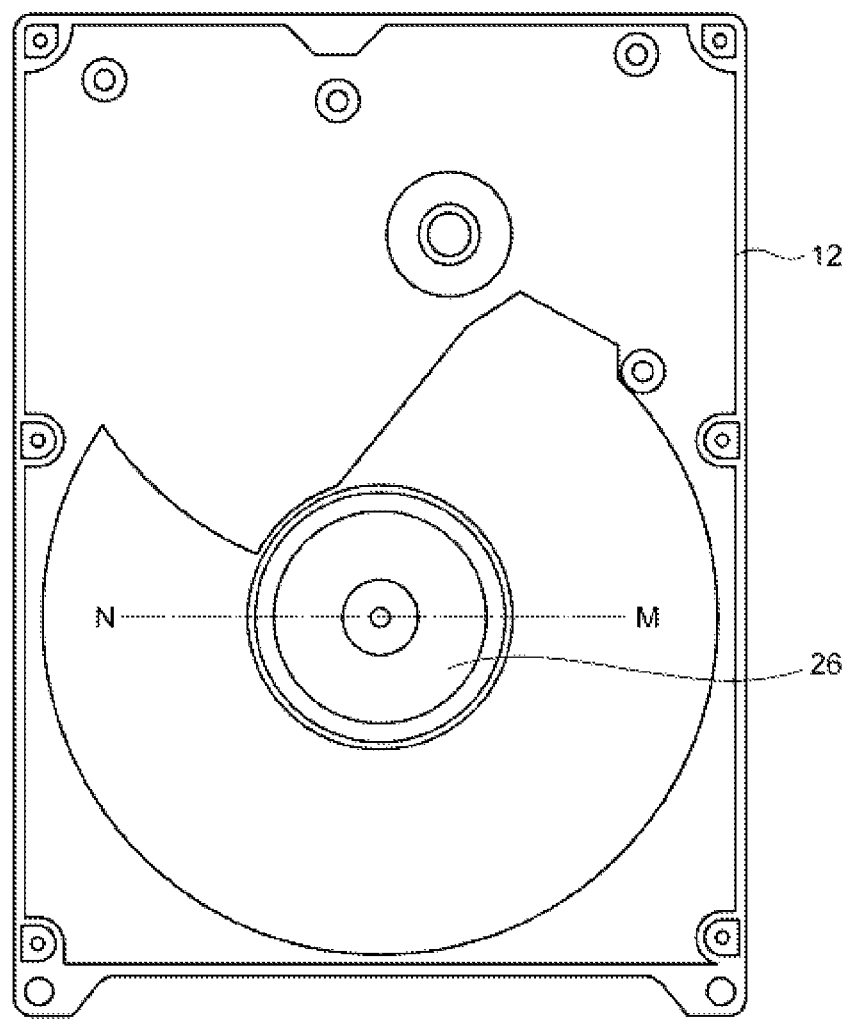
FIG. 2 is an explanatory diagram of a component of the disk drive device which is shown in FIG. 1 and which rotates and drives a recording disk.

FIG. 2 is a cross-sectional view showing a subassembly 28 having a bearing unit and a rotating body like the hub member 26 assembled with a base member of the rotating device manufactured through the manufacturing method of the present embodiment. In the present embodiment, the recording disk 20, the magnetic head 24, the swing arm 22, the arm bearing unit 16, the voice coil motor 18 and a cover that covers the entire rotating device are attached to the subassembly 28, thereby completing an HDD.

Figure 3:
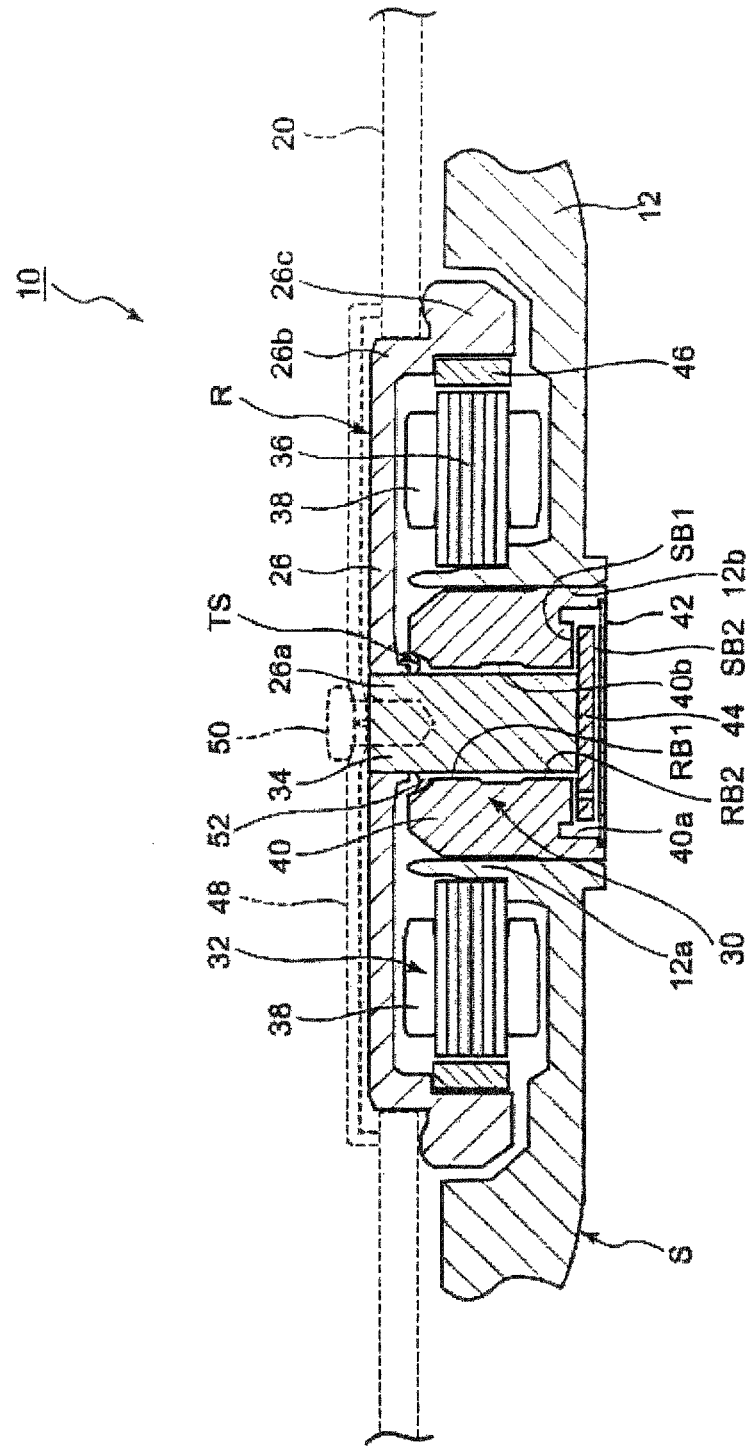
FIG. 3 is a cross-sectional view taken along a line M-N in FIG. 2.

FIG. 3 is a cross-sectional view taken along a cut line M-N in FIG. 2 and showing a part of the rotating device 10 shown in FIG. 1.

As shown in FIG. 3, the rotating device 10 of the present embodiment includes a fixed body portion S, a rotating body portion R, a bearing unit 30 that has a radial fluid dynamic bearing unit configured by radial dynamic fluid pressure grooves RB1 and RB2 and a lubricant, and a thrust fluid dynamic bearing unit configured by thrust dynamic pressure grooves SB1 and SB2, and a drive unit 32 that rotates and drives the rotating body portion R relative to the fixed body portion S through those fluid dynamic bearing units. As an example, FIG. 3 shows a configuration of a so-called shaft-rotating rotating device 10 that causes the hub member 26 supporting the recording disk 20 and a shaft 34 to rotate together. The components configuring the rotating device 10 may be classified into a plurality of groups among groups functionally divided into the fixed body portion S, the bearing unit 30, the rotating body portion R, and the drive unit 32. For example, the shaft 34 is classified in both rotating body portion R and bearing unit 30.

The fixed body portion S includes the base member 12, a stator core 36, a coil 38, a sleeve 40, and a counter plate 42. The stator core 36 is fixed to the outer wall surface of a cylinder portion 12a formed on the base member 12. The sleeve 40 is a cylindrical component and is formed of metal or a resin with a conductivity. The outer circumference surface of the sleeve 40 forms an outer circumference surface of the bearing unit 30 to be discussed later. The bearing unit 30 is fixed in a bearing hole 12b formed by the inner wall surface of the cylinder portion 12a of the base member 12 by means of an adhesive, etc. The discoid counter plate 42 is fixed to one end of the sleeve 40, thereby sealing the interior of the base member 12 where the recording disk 20, etc., is retained.

The base member 12 can be formed by, for example, applying an epoxy resin coating on the surface of a base material formed by aluminum die casting and cutting and machining some of such base material, by a press process of an aluminum plate, or by nickel plating on a steel plate having undergone a press process. The stator core 36 is formed by laminating a plurality of magnetic plates like ferrosilicon plates together and by applying insulation coating on respective surfaces thereof with an electro-deposition coating, a powder coating, etc. Moreover, the stator core 36 is a ring-shaped member having a plurality of protrusive poles (unillustrated) protruding outwardly of the radial direction, and each protrusive pole is wound by the coil 38. When, for example, the rotating device 10 is subjected to a three-phase drive, the number of protrusive poles is nine. The wiring terminal of the coil 38 is soldered on an FPC (unillustrated) arranged at the bottom of the base member 12.

The rotating body R includes the hub member 26, the shaft 34, a flange 44 and a magnet 46. The hub member 26 is a substantially cup-shaped member and has an outer circumferential cylinder portion 26b coaxial with a center hole 26a and an outward extending portion 26c extending outwardly at the lower end of the outer circumferential cylinder portion 26b. The magnet 46 in a ring shape is fixed to the inner wall surface of the outward extending portion 26c. The hub member 26 can be formed by die-molding or machining of metal, such as stainless steel, aluminum, or iron, or a conductive resin. The magnet 46 is formed of, for example, an Nd—Fe—B (neodymium-iron-boron) based material, and has surface having undergone an anti-corrosion treatment like an electro-deposition coating or a spray coating. In the present embodiment, the inner circumference of the magnet 46 is magnetized with, for example, 12 poles.

The shaft 34 has one end fixed to the center hole 26a formed in the hub member 26, and has another end to which the flange 44 in a discoid shape is fixed. The shaft 34 can be formed of a metal with a conductivity like stainless steel. The flange 44 can be formed of a metal material or a resin with a conductivity. The sleeve 40 has a flange retaining space 40a which retains the flange 44 and which is formed at one end of the sleeve 40. Hence, the sleeve 40 supports the shaft 34 fixed with the flange 44 while allowing a relative rotation thereof between the sleeve 40 and the shaft 34 in a space defined by a cylinder inner wall surface 40b and the flange retaining space 40a.

The shaft 34 with the flange 44 of the rotating body portion R is inserted in the sleeve 40 of the fixed body portion S along the cylinder inner wall surface 40b. As a result, the rotating body portion R is rotatably supported by the fixed body portion S through radial fluid dynamic bearing unit configured by the radial dynamic pressure grooves RB1 and RB2 and the lubricant, and the thrust fluid dynamic bearing unit configured by the thrust dynamic pressure grooves SB1 and SB2 and the lubricant. The drive unit 32 includes the stator core 36, the coil 38, and the magnet 46. At this time, the hub member 26 configures a magnetic circuit together with the stator core 36 and the magnet 46. Hence, the rotating body portion R is rotated and driven by sequentially allowing a current to flow through respective coils 38 under a control by the drive circuit provided externally.

The outer circumferential cylinder portion 26b of the hub member 26 of the present embodiment is engaged with a center hole of the recording disk 20 and the outward extending portion 26c positions and supports the recording disk 20. A clamper 48 is mounted on the top face of the recording disk 20, and is fixed to the hub member 26 by a screw 50. Hence, the recording disk 20 is fixed together with the hub member 26, and is rotatable together with the hub member 26.

Next, an explanation will be given of the bearing unit 30.

The bearing unit 30 includes the shaft 34, the flange 44, the sleeve 40, and the counter plate 42. The cylinder inner wall surface 40b of the sleeve 40 and the outer circumference surface of the shaft 34 facing therewith form a radial space. The radial dynamic pressure grooves RB1 and RB2 are formed in at least either one of the cylinder inner wall surface 40b of the sleeve 40 and the outer circumference surface of the shaft 34 in order to generate a dynamic pressure for a support in the radial direction. The radial dynamic pressure groove RB1 is formed at a near side to the hub member 26, while the radial dynamic pressure groove RB2 is formed at a more distant side from the hub member 26 than the radial dynamic pressure groove RB1. The radial dynamic pressure grooves RB1 and RB2 are, for example, herringbone or spiral grooves. Those radial dynamic pressure grooves RB1 and RB2 are spaced apart from each other in the axial direction of the shaft 34. The formed spaces of respective radial dynamic pressure grooves RB1 and RB2 are filled with a lubricant 52 like an oil. Accordingly, the lubricant 52 becomes partially high pressure upon rotation of the shaft 34. The shaft 34 is moved apart from a wall surface therearound by that pressure, and is in a rotational state of substantially non-contact in the radial direction.

As explained above, the flange 44 that rotates together with the shaft 34 is fixed to the lower end thereof. Moreover, the flange retaining space 40a retaining the flange 44 in a freely rotatable manner is formed at the center of the bottom face of the sleeve 40. The flange retaining space 40a has one end blocked by the counter plate 42, so that the airtightness in the flange retaining space 40a and the retaining space of the shaft 34 continuous therefrom is maintained.

The thrust dynamic pressure groove SB1 is formed in at least either one of the surfaces of the flange 44 and the sleeve 40 facing in the axial direction, and the thrust dynamic pressure groove SB2 is formed in at least either one of the surfaces of the flange 44 and the counter plate 42 facing with each other. Those grooves work together with the lubricant 52, thereby forming the thrust fluid dynamic bearing unit. The thrust dynamic pressure grooves SB1 and SB2 are formed in a spiral or herringbone shape, and generate a pump-in pressure. That is, the pump-in dynamic pressure is generated by the flange 44 that is the rotating body portion R rotating relative to the fixed body portion S which is the sleeve 40 and the counter plate 42. As a result, the rotating body portion R including the flange 44 becomes a substantially non-contact state relative to the fixed body portion S by the generated dynamic pressure with a predetermined clearance in the axial direction, and the rotating body portion R including the hub member 26 is supported in a non-contact state relative to the fixed body portion S.

In the case of the present embodiment, the lubricant 52 filled in the gap between the radial fluid dynamic bearing unit and the thrust fluid dynamic bearing unit is shared by the two bearing units. The open-end side of the sleeve 40 configures a capillary seal portion TS formed so that the clearance between the inner circumference of the sleeve 40 and the outer circumference of the shaft 34 gradually becomes large toward the outward of the clearance. A space including the radial dynamic pressure grooves RB1 and RB2 and the thrust dynamic pressure grooves SB1 and SB2 is filled with the lubricant 52 up to the halfway of the capillary seal portion TS. The capillary seal portion TS prevents the lubricant 52 from leaking to the exterior from the filled position by a capillary action.

Next, an explanation will be given of a manufacturing method of the rotating device 10 employing the above-explained configuration with reference to FIG. 4 and following figures.

The manufacturing method of the rotating device 10 according to the present embodiment includes a first machining process, a second machining process, a blowing process, a cleaning process, and an assembling process which are basic processes. The first machining process is for machining the bearing hole 12b in the base member 12 while supplying a first cutting lubricant. The second machining process is continuous from the first machining process, and is for machining a tap hole in the base member 12 while supplying a second cutting lubricant. The blowing process blows at least either one of the bearing hole 12b and the tap hole with a fluid in order to eliminate machining residue, such as cutting and cutting lubricant. The cleaning process is for cleaning the base member 12 having undergone the successive machining with water, etc. The assembling process is for assembling the bearing unit 30, and the hub member 26, the shaft 34, and the like configuring the rotating body portion R with the base member 12. The above-explained processes are basic processes, and in the present embodiment, as shown in FIG. 4, various processes in order to further effectively reduce particles on the rotating device 10 may be additionally carried out.

For example, following to a first machining process 401 for forming the bearing hole 12b in the base member 12, a first moistening process 402 is carried out which increases the moistening of the first cutting lubricant adhered to the base member 12 having undergone machining through the first machining process 401. By increasing the moistening of the first cutting lubricant, an elimination work thereof in the following process becomes easy.

An air spraying process 404 is provided which is of spraying high-pressure air to the base member 12 formed with tap holes 12c, 12d, 12e, and 12f machined in a second machining process 403 in order to eliminate the machining residue, and a liquid spraying process 405 is further provided which is of spraying a high-pressure liquid to the base member 12 in order to eliminate the machining residue. In the present embodiment, the air spraying process 404 and the liquid spraying process 405 are collectively referred to as the blowing process. Moreover, the execution order of the air spraying process 404 and the liquid spraying process 405 may be reversed. Furthermore, a second moistening process may be provided between the second machining process 403 and the air spraying process 404. In this case, like the first moistening process 402, it is effective that elimination of the second cutting lubricant used in the second machining process 403 becomes easy in the following process.

After the cleaning process 406 of cleaning the base member 12 completes, an airtightness measuring process 407 of inspecting the airtightness of the base member 12 may be provided. Thereafter, in the assembling process 408, the bearing unit 30 and the rotating body portion R may be assembled with the base member 12 which has passed the inspection.

Figure 4:
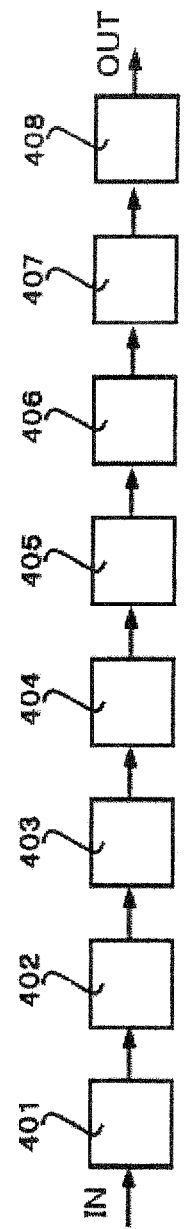
FIG. 4 is an explanatory diagram of a process procedure of the manufacturing method of the rotating device according to the embodiment.

In the example case shown in FIG. 4, a base member 12 before machining is loaded in from the IN side, and is conveyed to the first machining process 401, the first moistening process 402, the second machining process 403, (the second moistening process), the air spraying process 404, the liquid spraying process 405, the cleaning process 406, the airtightness measuring process 407, and the assembling process 408, respectively. Next, the rotating device 10 having undergone completion of assembling is ejected from the OUT side of the assembling process 408.

In FIG. 4, the assembling process 408 is arranged in a clean room. The clean room is filled with clean air, and is relatively adjusted to a positive pressure. The processes before the cleaning process 406 which are preceding processes are arranged in a room relatively adjusted to a negative pressure. By adjusting the pressure of the assembling process 408 to be a positive pressure, even if particles taken out from the base member 12 through the processes before the cleaning process 406 are suspended in air, such particles are not likely to enter the assembling-process-408 side. Note that the airtightness measuring process 407 may be carried out in the same area as that of the cleaning process 406 or may be carried out at the same area as that of the assembling process 408.

Next, respective steps will be explained in detail. First, the first machining process 401 will be explained.

The cylinder portion 12a for attaching the bearing unit 30 is formed in the substantive center of the base member 12, and the inner wall surface of the cylinder portion 12a defines the bearing hole 12b. A hole corresponding to the bearing hole 12b is provided by aluminum die casting in the substantive center of the base member 12 before the first machining process 12. In the first machining process 401, the inner circumference side face of the hole corresponding to the bearing hole 12b is cut and machined to be the bearing hole 12b with a predetermined precision. In the first machining process 401, convey means like a belt conveyer for conveying a machining target that is the base member 12 is provided, and the base member 12 is sequentially conveyed between machining tools like a milling machine and a machining center provided in the first machining process 401. In the present embodiment, in the first machining process, in order to maintain a good machining precision, with the first cutting lubricant being supplied to the base member 12 for reducing a friction in machining and for cooling, the inner circumference surface of the bearing hole 12b is machined. An example of the first cutting lubricant is a water-soluble cutting lubricant obtained by dissolving an oil in water using a solvent. In the first machining process 401, formation of the cylinder portion 12a (formation of the hole corresponding to the bearing hole 12b) and the finishing of the bearing hole 12b may be both carried out.

Figure 5A:
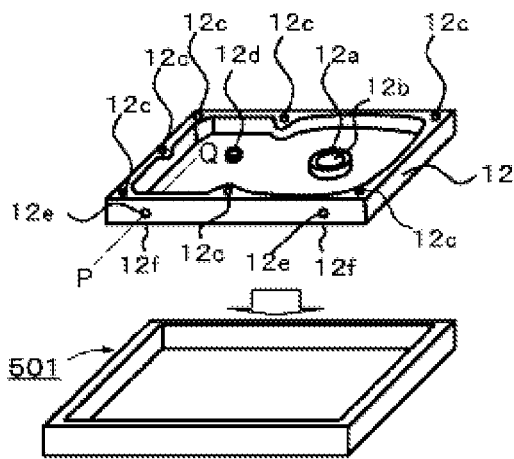
FIG. 5A is an explanatory diagram of respective positions of a bearing hole and a tap hole formed in a base member through the manufacturing method of the rotating device according to the embodiment and of a container which retains and conveys the base member.

The first cutting lubricant supplied to the base member 12 in the first machining process 401 has volatile components vaporized as time elapses, and the residue components are dried and solidified. The remaining first cutting lubricant needs a large amount of work to be eliminated after solidified. Moreover, some of such solidified lubricants remain even after elimination, which become particles. Hence, like the present embodiment, the base member 12 may be conveyed in the first machining process 401 while suppressing vaporization of the volatile components. More specifically, the base member 12 is retained in a container 501 and is conveyed individually while the first machining process 401 is being carried out. FIG. 5A is an explanatory diagram of respective positions of the bearing hole 12b and tap holes 12c to 12f formed in the base member 12 by the manufacturing method of the rotating device 10 of the present embodiment and of a container 501 that retains and conveys the base member 12. The container 501 is in a box-like shape, retains the base member 12 inwardly of the defined surrounding wall, thereby suppressing vaporization of the volatile components contained in the first cutting lubricant. The container 501 may further have a lid. In this case, it is desirable that the lid should be opened or taken out right before the actual machining is carried out and should be put on the container 501 right after the machining. As a result, generation of the particles originating from the first cutting lubricant can be reduced or suppressed. The container 501 is formed by molding a general-purpose plastic, for example. It is preferable from the standpoint of formation of the container 501 in a constant shape. Moreover, when the base member 12 is conveyed by the convey means, if the base member 12 directly contacts the convey means, minute scratches may be formed in the base member 12 due to rubbing, etc. In contrast, by conveying the base member 12 in the container 501, such formation of scratch can be avoided, so that the use of container 501 is desirable.

Moreover, suppression of any effect of drying of the first cutting lubricant as explained above is effective for reduction of the particles. Accordingly, as is indicated in the present embodiment, the first moistening process 402 of increasing the moistening of the first cutting lubricant adhered to the base member having undergone the machining through the first machining process may be provided. In the first moistening process 402, a liquid is supplied to make the first cutting lubricant wet, thereby suppressing the drying thereof. By carrying out the humidification through the first moistening process 402 together with the use of the container 501, the drying of the first cutting lubricant can be further suppressed.

If the affinity of the liquid added in the first moistening process 402 to the first cutting lubricant is small, the effect of suppressing the drying of the first cutting lubricant may become insufficient. Accordingly, in the first moistening process 402, a liquid which is inseparable from the first cutting lubricant may be further added to the first cutting lubricant adhered to the base member 12 in order to let the first cutting lubricant to be moistened. For example, when the first cutting lubricant is water-soluble, pure water can be used which is a liquid that is inseparable from the first cutting lubricant. Such pure water can be supplied as mist or shower in order to let the first cutting lubricant to be moistened. Moreover, a liquid inseparable from the first cutting lubricant may be sprayed in order to let the first cutting lubricant to be moistened. As a result, the drying of the first cutting lubricant can be reduced.

Next, an explanation will be given of the second machining process 403.

As shown in FIG. 5A, the tap holes 12c for attaching a cover thereto by screws are provided in the external wall of the base member 12. In the case of FIG. 5A, the tap holes 12c are provided in, for example, seven locations. Moreover, tap holes 12e and 12f for attaching the rotating device 10 to another device are provided at the surrounding portion of the base member 12. In the case of FIG. 5A, two tap holes 12e are illustrated in one side face of the base member 12. Moreover, the tap holes 12f indicated only by the reference numerals are formed in the rear face of the base member 12. Respective two tap holes 12e and 12f are formed at symmetrical locations in the base member 12. It will be discussed later but the tap hole 12f is provided as a blind hole from the bottom face of the base member toward the upper direction, and the tap hole 12e is provided as a blind hole from the side face of the base member 12 toward the horizontal direction. Furthermore, a tap hole 12d for attaching the arm bearing unit 16 and the voice coil motor 18, etc., is provided at the center of the base member 12. Like the first machining process 401, in the second machining process 403, the base member 12 is successively conveyed by the convey means like a belt conveyer in a state retained in the container 501. It is not illustrated in FIG. 5A but the container 501 is provided with entrance openings where the tap enters so as not to interfere with the container 501 when the tap holes 12c to 12f are formed. The base member 12 may be supported relative to the container 501 so that the locations where the tap holes 12c to 12f are formed are not hidden by the walls configuring the container 501.

Figure 5B:
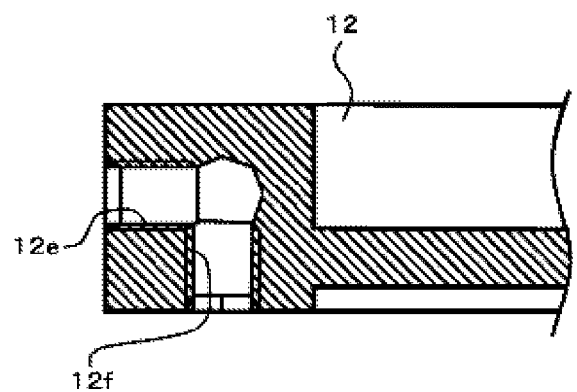
FIG. 5B is an explanatory diagram of a tap hole of a base member in the form of a blind hole.

FIG. 5B is a cross-sectional view of the base member 12 taken along a line P-Q in FIG. 5A. When the rotating device 10 is attached to another device, the rotating device 10 is fastened thereto by screws using the tap holes 12e and 12f. When the tap holes 12e and 12f are provided so as to pass all the way through the base member 12, if machining residue like machined chip remains in the tap holes 12e and 12f, there is a possibility that the machining residue is pushed out into the interior of the rotating device 10 when the screw is fastened. If the machining residue enters in the interior, it becomes a particle, resulting in reduction of the performance and functional failure. Conversely, according to the rotating device 10 of the present embodiment, the tap holes 12e and 12f are blind holes.

Meanwhile, if the tap holes 12e and 12f are simply formed as blind holes, it may become difficult to eliminate burr or cutting entered in the interior of the tap holes 12e and 12f. Accordingly, as shown in FIG. 5B, the tap hole 12e opened in the side face of the base member 12 and the tap hole 12f opened in the bottom face of the base member 12 are formed as blind holes, respectively, and the tap holes 12e and 12f may be partially communicated with each other at a deeper region. As a result, the machining residue present in the interior of the tap hole can be easily ejected out from the tap hole 12f by supplying compressed air from the tap hole 12e, for example.

Provisional holes formed by aluminum die casting are formed in locations corresponding to the tap holes 12c, 12d, 12e, and 12f of the base member 12 before processed through the second machining process 403. In the second machining process 403, using such provisional holes formed in the base member 12 as machining guides, the predetermined tap holes 12c, 12d, 12e, and 12f are formed. The tap holes 12c, 12d, 12e, and 12f can be formed in the second machining process 403 using, for example, a tapping machine. A second cutting lubricant may be supplied to the base member 12 in the second machining process 403 so as to maintain a good machining precision, and then the tap holes 12c, 12d, 12e, and 12f can be machined. The second cutting lubricant can be a water-soluble cutting lubricant obtained by dissolving an oil into water using a solvent like the first cutting lubricant.

In the related art, when the processes are independent like the first machining process and the second machining process, such processes can be designed through a so-called batch scheme. According to the batch scheme, it is typical that a predetermined number of the base members 12 that are machined products are temporarily stored as a unit after the first machining process, and before the second machining process is started, the predetermined number of base members 12 are conveyed from the temporal storage location to the process. When the base members 12 are stored, a transshipment work by the convey means is requisite, so that the base member 12 may be scratched at this time. Accordingly, in the second machining process 403, individual base member 12 may be conveyed from the first machining process 401 and may be subjected to a predetermined machining. In this case, it is desirable that the base member 12 should be individually retained in the container 501 continuously from the first machining process 401. Unlike the related art, the base member 12 is not stored between the first machining process 401 and the second machining process 403, so that scratching, re-adhesion of particles, etc., during storage can be avoided.

If a convey time from the first machining process 401 to the second machining process 403 is long, the possibility that the residue components of the first cutting lubricant applied to the base member 12 in the first machining process 401 are dried and solidified becomes high. Accordingly, the second machining process 403 may be executed before the first cutting lubricant adhered to the base member 12 is solidified after the machining through the first machining process 401. That is, it is desirable that the second machining process 403 should be executed while the moistened state of the first cutting lubricant applied to the base member 12 in the first machining process 401 is equal to or greater than a predetermined reference level. More specifically, it is desirable that the second machining process 403 should be executed before the moistened area of the base member 12 becomes lower than 80% relative to the whole area.

A condition of the convey time from the first machining process 401 to the second machining process 403 can be obtained through a test. For example, it is confirmed by the inventors of the present invention that solidification of the first cutting lubricant is not a problem in practice if the second machining process 403 is executed within 10 minutes after the machining through the first machining process 401. More preferably, the second machining process 403 should be executed within three minutes after the machining through the first machining process 401. In this case, the problem of the residue of the first cutting lubricant can be further reduced.

By providing the first moistening process 402 that is executed after the first machining process 401, adjustment of the moistening of the first cutting lubricant of the base member 12 is enabled. As a result, the condition of the convey time from the first machining process 401 to the second machining process 403 can have a degree of freedom to some level, thereby increasing the variation of the process designing.

Next, an explanation will be given of the air spraying process 404 that is a kind of the blowing process.

The base member 12 having undergone machining of the tap holes 12c to 12f through the second machining process 403 is conveyed to the air spraying process 404. In the air spraying process 404, spray nozzles arranged accordingly to respective tap holes 12c to 12f spray high-pressure air to respective tap holes 12c to 12f, thereby blowing out the machining residue, such as cutting and burr, present in the interior of the tap holes 12c to 12f and present therearound. Most cutting and burr produced through the first machining process 401 and the second machining process 403 can be eliminated, and thus it is effective for reduction of the particles. A second moistening process of increasing the moistening of the second cutting lubricant adhered to the base member 12 after the machining through the second machining process 403 may be provided before the air spraying process 404. Like the first moistening process 420, a liquid is supplied in the second moistening process in order to let the second cutting lubricant to be moistened and thus to suppress drying thereof, and elimination of the machining residue can be effectively accomplished by high-pressure air supplied in the air spraying process 404 following the second moistening process. It is desirable that the liquid supplied in the second moistening process should be selected accordingly depending on the components of the second cutting lubricant, but pure water can be used if the second cutting lubricant is water-soluble like the first cutting lubricant.

Figure 6A:
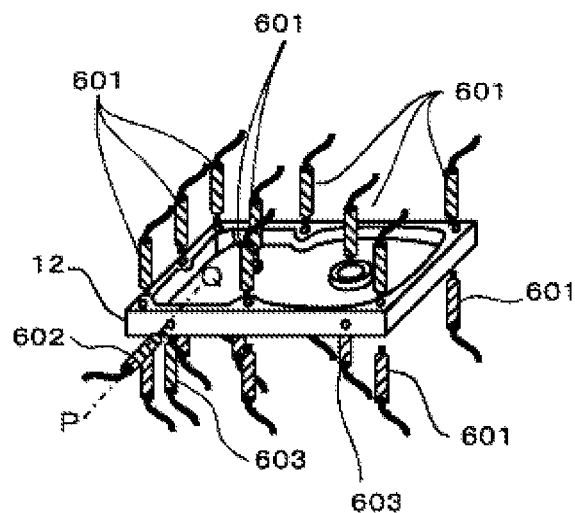
FIG. 6A is an explanatory diagram of a blowing process in the manufacturing method of the rotating device of the embodiment.
Figure 6B:
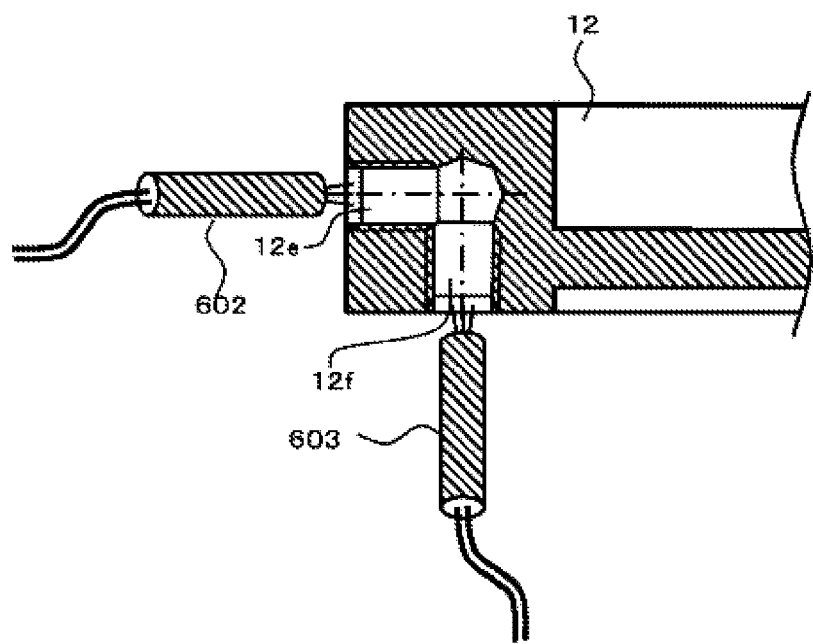
FIG. 6B is an explanatory diagram of the blowing process in the manufacturing method of the rotating device of the embodiment.

Next, the liquid spraying process 405 that is a kind of the blowing process will be explained with reference to FIGS. 6A and 6B.

After the air spraying process 404, the base member 12 is conveyed to the liquid spraying process 405. In the liquid spraying process 405, liquid spray nozzles 601 are arranged at locations corresponding to the tap holes 12c and 12d, respectively. Moreover, liquid spray nozzles 602 are arranged at locations corresponding to respective tap holes 12e, and liquid spray nozzles 603 are arranged at locations corresponding to respective tap holes 12f. For example, high-pressure pure water is sprayed from respective liquid spray nozzles 601, 602, and 603 to corresponding tap holes 12c, 12d, 12e, and 12f, and the machining residues like cutting and burr produced through the first and second machining processes 401 and 403 are eliminated. The liquid spraying process 405 can efficiently eliminate the machining residue using large kinetic energy of the sprayed liquid, and the particles can be reduced effectively with a high reliability.

If the clearance between respective liquid spray nozzles 601, 602 and 603 and respective tap holes 12c, 12d, 12e, and 12f is large, the kinetic energy of sprayed pure water decreases, so that the elimination efficiency of the machining residue may decrease. The clearance which is between the liquid spray nozzles 601, 602 and 603 and the corresponding tap holes 12c, 12d, 12e, and 12f and which enables elimination of the machining residue at a desired level can be obtained through a test. For example, the liquid spray process 405 may be executed while moving at least either one of the liquid spray nozzles 601, 602 and 603 and the base member 12 so as to maintain the clearance between the liquid spray nozzles 601, 602 and 603 and the corresponding tap holes 12c, 12d, 12e, and 12f to be equal to or smaller than 2 mm. It is confirmed by the inventors of the present invention that the machining residue can be eliminated at a level that brings about no problem in practice according to such a setting. Note that the clearance between the liquid spray nozzles and the corresponding tap holes in this specification means a minimum clearance between the tip of the liquid spray nozzle and the entrance of the corresponding tap hole.

Conversely, if the clearance between the liquid spray nozzles 601, 602 and 603 and the corresponding tap holes 12c, 12d, 12e, and 12f is small, the liquid spray nozzles 601, 602 and 603 may contact the base member 12 and the base member 12 may be scratched. Accordingly, it is appropriate in the liquid spraying process 405 that the clearance between the liquid spray nozzles 601, 602 and 603 and the corresponding tap holes 12c, 12d, 12e, and 12f is maintained within a range equal to or larger than 0.5 mm. By defining the approximation limit between respective liquid spray nozzles 601, 602 and 603 and the base member 12, a damage of the base member 12 due to a contact therebetween can be eliminated or reduced.

Moreover, if a time of spraying the pure water to the base member 12 in the liquid spraying process 405 is short, the machining residue is not eliminated sufficiently in some cases. Accordingly, the liquid spraying process 405 may be executed so that the time at which respective liquid spray nozzles 601, 602 and 603 spray the pure water to the base member 12 is set to be equal to or longer than 2 seconds. It is confirmed by the inventors of the present invention that the machining residue can be eliminated at a level that brings about no problem in practice by executing the liquid spraying process 405 through such a setting. Conversely, if the time of spraying the pure water to the base member 12 is long, the work hour becomes long and the work efficiency may decrease. Accordingly, the liquid spraying process 405 may be executed so that the time at which respective liquid spray nozzles 601, 602 and 603 spray the pure water to the base member 12 is set to be equal to or shorter than 15 seconds. Execution of the liquid spraying process 405 through such a setting accomplishes both effective elimination of the machining residue and improvement of the efficiency of work.

In order to eliminate the machining residue within the above-explained spray time, according to the manufacturing method of the rotating device 10 of the present embodiment, the liquid spray nozzles 601, 602 and 603 have respective internal diameter adjusted within a range from 0.5 to 2 mm and the water pressure is adjusted within a range from 0.1 MPa to 0.5 MPa. It is confirmed by the inventors of the present invention that the machining residue can be eliminated at a level that brings about no problem in practice while reduction of the workability is suppressed through such a setting.

Meanwhile, if the pure water is sprayed in the liquid spraying process 405 from only one of the tap holes 12c and 12d passing through in the vertical direction of the base member 12, a work time necessary for eliminating the machining residue to the opposite side becomes long, and the workability may decrease. Hence, in the liquid spraying process 405 of the present embodiment, the pure water may be sprayed from different directions to a tap hole using equal to or greater than two liquid spray nozzles. For example, the pure water may be sprayed from the liquid spray nozzles provided in directions corresponding to the upper face and the bottom face of the base member 12, respectively. As a result, the elimination efficiency of the machining residue can be improved. Moreover, as shown in FIG. 6B, when the tap hole 12e in the form of a blind hole and the tap hole 12f in the form of a blind hole are partially communicated with each other, by arranging the liquid spray nozzles at the opened sides of respective tap holes and spraying the pure water from both tap holes, the machining residue can be eliminated well. When the pure water is sprayed from both tap holes in this fashion, if the axial lines of liquid spray nozzles are on the same line, the ejecting efficiency of the machining residue may decrease. Accordingly, it is desirable that respective axial lines of the liquid spray nozzles should not be on the same line.

In the liquid spraying process 405, in order to simultaneously and effectively eliminate the machining residue remaining in respective tap holes formed in the upper face, the bottom face and the side face of the base member 12, the pure water may be sprayed from liquid spray nozzles provided in different three directions corresponding to the upper face, the bottom face, and the side face of the base member 12. According to the manufacturing method of the rotating device 10 of the present embodiment, as shown in FIG. 6A, the pure water is simultaneously sprayed from the liquid spray nozzles 601, 602 and 603 to nine locations of the upper face of the base member 12, thirteen locations (three locations among those are unillustrated) of the bottom face, and four locations (three locations among those are unillustrated). Such arrangement of the liquid spray nozzles enables effective elimination of the machining residue. Moreover, according to another example, one or a plurality of liquid spray nozzles may be moved in order to eliminate the machining residue in respective tap holes sequentially. Conversely, the position of the liquid spray nozzle may be fixed but the base member 12 may be moved in parallel or rotated in order to eliminate the machining residue in respective tap holes sequentially. In this case, the number of liquid spray nozzles can be reduced, and the equipment of the liquid spraying process 405 can be simplified.

Next, an explanation will be given of the cleaning process 406.

Figure 7:
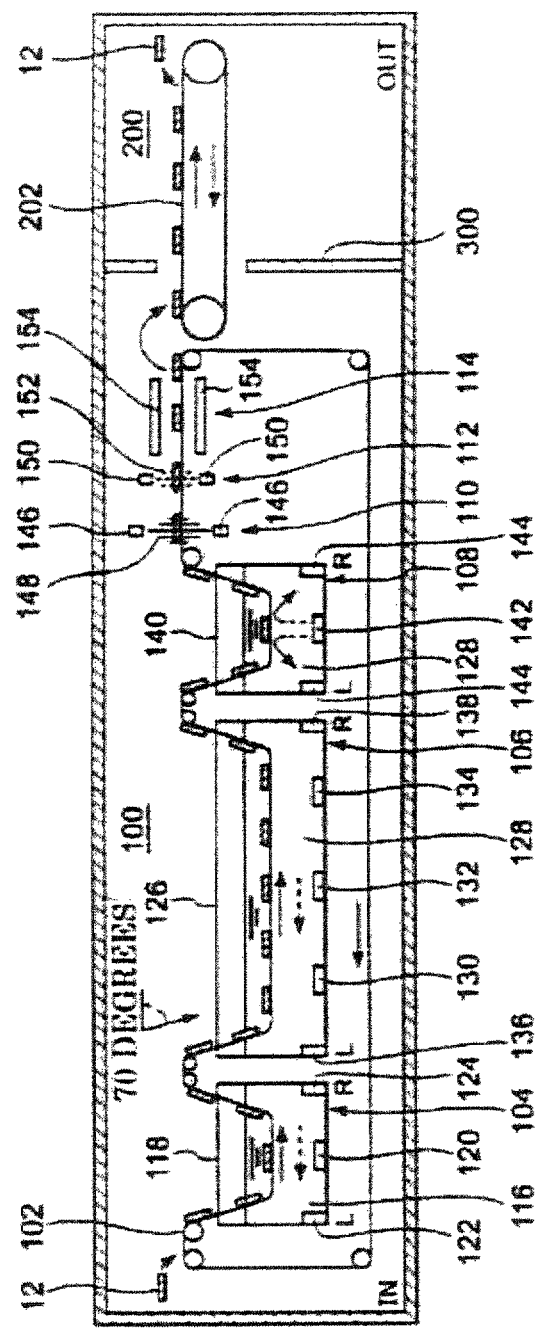
FIG. 7 is an explanatory diagram of a cleaning process and an assembling process in the manufacturing method of the rotating device of the embodiment.

There is a possibility that inorganic-grain-based particles originating from each inorganic material and hydrocarbon-based particles originating from each organic material compositely adhere to the base member 12. Therefore, the cleaning process 406 adopts elimination technique appropriate for each kind of particles. FIG. 7 shows an example case in which the cleaning process 406 and the assembling process 408 of the present embodiment are executed in successive areas. A work area 100 where the cleaning process 406 is executed is substantially separated from a work area 200 where the assembling process 408 is executed by a simple partition wall 300, and the work area 200 is adjusted to be a positive pressure relative to the work area 100. It is desirable that the work areas 100 and 200 should be clean rooms of equal to or greater than a predetermined level. The work area 200 that is set to be a positive pressure prevents suspended particles possibly present in the cleaning process 406 that eliminates the particles from moving into the assembling process 408 that is a later process of the cleaning process 406.

As shown in FIG. 7, the cleaning process 406 of the present embodiment includes an alkali cleaning process 104, a first pure water cleaning process 106, a second pure water cleaning process 108, a spray cleaning process 110, a water repelling process 112, and a drying process 114.

When a preceding process and a cleaning process are included in the manufacturing method, a technique of executing the method in a so-called batch scheme that executes respective processes independently can be applied. In this case, it is typical that the base members are temporarily stored with the predetermined number of the base members being as a unit after the base members are processed in the preceding process, and the predetermined number of base members are conveyed to the process from the temporal storage. In this case, the base member 12 may be scratched while being stored or while being conveyed. Hence, the cleaning process 406 may be successively executed from the liquid spraying process 405. When the base member 12 is not temporarily stored between the liquid spraying process 405 and the cleaning process 406, disadvantages such that the base member 12 is scratched while being stored can be avoided.

According to the cleaning process of the related art using a liquid, in many cases, the plurality of components like the base members 12 are put in a cleaning basket with several tens to several hundreds of the components being as a unit, soaked in a cleaning tank, and left as those are for a certain time in order to let ultrasound to act thereon. In this case, ultrasound hardly affects overlapped portions of the components, so that the elimination rate of particle decreases. Moreover, the particle elimination rate of the component located at the center region of the cleaning basket also decreases. Furthermore, it is unavoidable that there are a region where ultrasound strongly affects and a region where ultrasound weakly affects in the cleaning tank, the particle elimination rate of the component soaked at the weak region decreases, and the particle elimination rate largely varies due to a difference in the action of ultrasound component by component. Therefore, it is necessary to take a long cleaning time as a whole, and the work efficiency is poor. Still further, a large number of components are densely gathered, particles once eliminated are kept suspended in the vicinity of the components, and may re-adhere to the components.

In contrast, according to the cleaning process 406 of the present embodiment, the base members 12 are cleaned while those are successively conveyed at a predetermined clearance. That is, individual base members 12 are cleaned while being mounted on and conveyed by convey means 102. Ultrasound is caused to act individual base members 12 while the base members 12 are moved in a certain direction in each cleaning tank. Since individual base members 12 pass through the same ultrasound region, a difference in the action of ultrasound for respective base members 12 can be substantially cancelled, and the varying in the particle elimination rate can be suppressed.

When the base member 12 is conveyed by merely mounting the base member 12 on the convey means 102, the base member 12 may slip over the convey means 102 because of vibration or water stream at the time of conveyance, so that a clearance from another base member 12 cannot be maintained in some cases. Moreover, when such a movement is large, the base members 12 may collide with each other and may be scratched. Hence, as is indicated in the cleaning process 406 of the present embodiment, the convey means 102 is provided with support tables 801 fixed at a predetermined interval, and respective base members 12 are mounted on the support tables 801 and conveyed.

Figure 8:
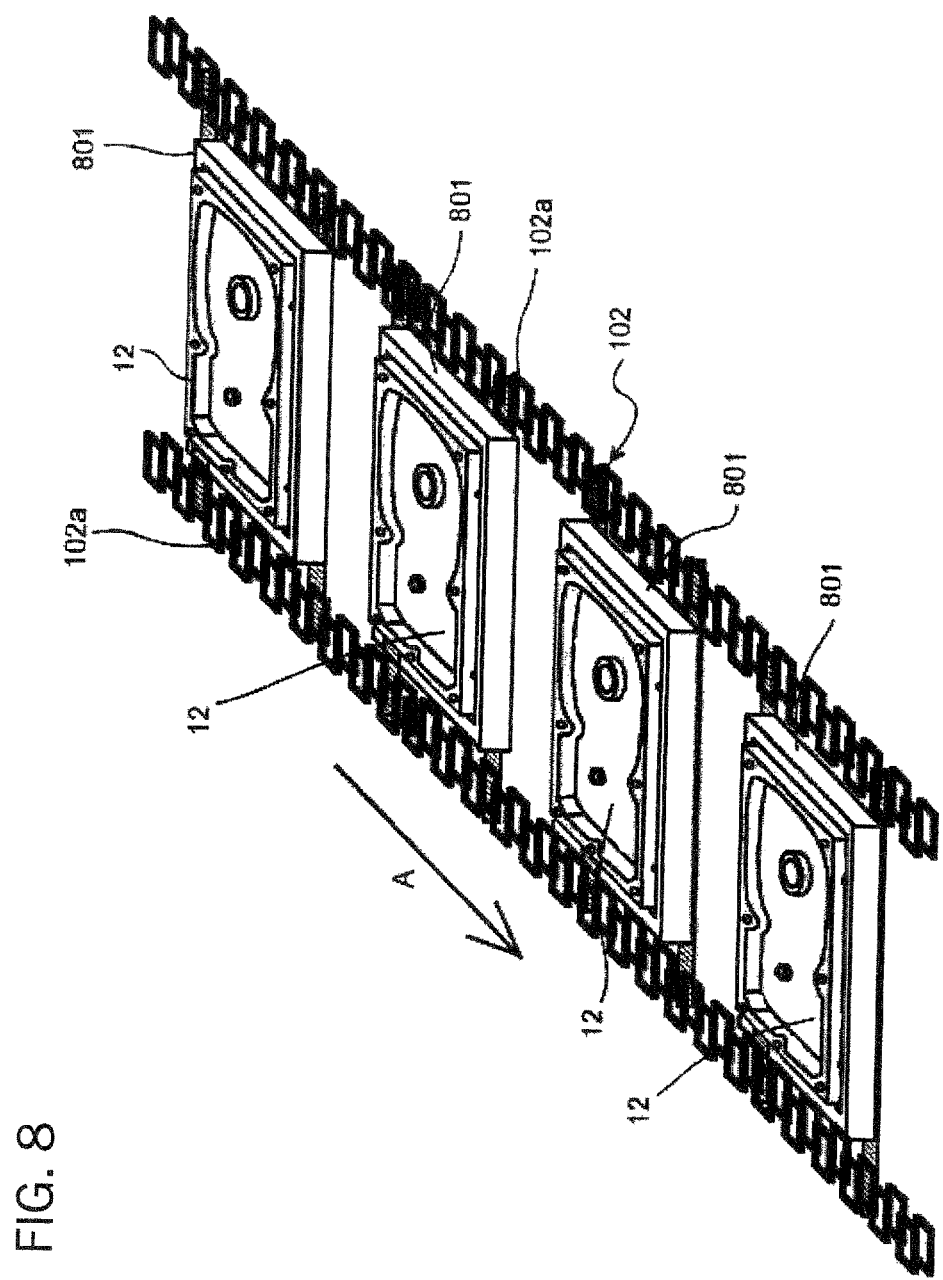
FIG. 8 is an explanatory diagram of a conveyer used in the cleaning process in the manufacturing method of the rotating device of the embodiment.

FIG. 8 shows illustrative convey means 102 according to the present embodiment. FIG. 8 shows an example case in which looped chains 102a provided in parallel with each other are employed as the convey means 102 and the support tables 801 are fixed at a predetermined interval between the chains 102a driven in the direction of an arrow A. That is, together with the movement of the chains in the direction of the arrow A, the base members 12 mounted on respective support tables 801 are conveyed. The alkali cleaning process 104, the first pure water cleaning process 106, the second pure water cleaning process 108, the spray cleaning process 110, the water repelling process 112, and the drying process 114 are successively executed on the base member 12 which is being conveyed. The support table 801 can be formed by, for example, molding of a general-purpose plastic. In this case, it is preferable from the standpoint of constant shape among the support tables 801.

Figure 9A:
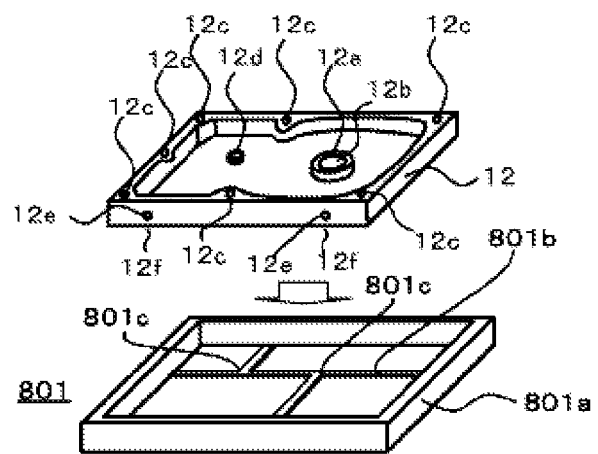
FIG. 9A is an explanatory diagram of a support stage used in the manufacturing method of the rotating device of the embodiment.
Figure 9B:
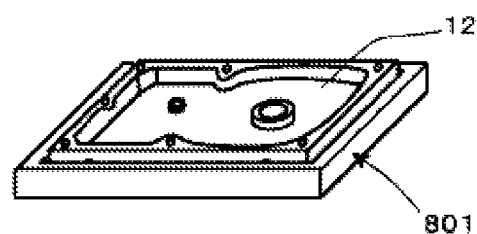
FIG. 9B is an explanatory diagram of the support stage used in the manufacturing method of the rotating device of the embodiment.

FIG. 9A is a perspective view of the base member 12 and the support table 801 on which the base member 12 is mounted. The support table 801 is provided with bridge portions that form spaces between the inner bottom face of the support table 801 and the supported face of the base member 12 at locations avoiding at least portions where either one of the bearing hole 12b and the tap holes 12c to 12f are formed with the base member 12 being mounted on the support table 801. More specifically, the support table 801 includes a frame member 801a that surrounds the base member 12, and bridge portions 801b that are crossed over on a plurality of points spaced apart from one another in the frame member 801a. Moreover, the support table 801 may be provided with hooks around the upper face of the base member 12 so as to cover the upper face thereof with the base member 12 being mounted on the support table 801, thereby preventing the base member 12 from moving out from the support table 801 while being conveyed. In this case, as shown in FIG. 7, even if the base member 12 is conveyed in a tilted state in the cleaning process 406, it is possible to prevent the base member 12 from being detached from the support table 801, and thus the conveyance reliability improves.

Moreover, with the base member 12 being mounted on the support table 801, if the bridge portions 801b are provided at locations blocking the bearing hole 12b and the tap holes 12c, 12d, and 12f, the cleaning time for the bearing hole 12b and that of the tap holes 12c, 12d, and 12f become long, and the work efficiency decreases. Hence, the support table 801 of the present embodiment is provided with the bridge portions 801b at locations avoiding at least either one of the bearing hole 12b and the tap holes 12c, 12d, and 12f with the base member 12 being mounted on the support table 801. Likewise, if the tap hole 12e formed in the side face of the base member 12 is blocked by the frame member 801a, the cleaning efficiency decreases. Therefore, it is desirable that the frame member 801a should be provided with an unillustrated cleaning opening avoiding the location where the tap hole 12e is formed.

The support table 801 including the frame member 801a and the bridge portions 801b may deform as time advances and it may become difficult for the support table 801 to mount the base member 12. Accordingly, the support table 801 of the present embodiment may have intersections 801c formed so as to intersect with the bridge portions 801b at a right angle or a predetermined angle. In this case, the rigidity of the support table 801 is easily increased, resulting in suppression of deformation.

In the cleaning process 406, when the contact angle of the surface of the support table 801 is small, it is likely to be wet by a cleaning liquid. That is, the water repelling performance decreases and it takes a long time for drying, and thus the work efficiency may decrease. Accordingly, it is desirable in the cleaning process 406 of the present embodiment that the surface of the support table 801 should be formed of a material having an obtuse contact angle. As a result, the water repelling performance of the support table 801 is improved, and the elimination of the cleaning liquid from the mounted base member 12 is facilitated, and as a result, the drying of the base member 12 can be accelerated.

Next, the specific example of the cleaning process 406 will be explained.

First, the alkali cleaning process 104 is executed which performs alkali ultrasound cleaning on the base member 12 by generating ultrasound at a frequency of 40 kHz by an ultrasound generator 120 in an alkali cleaning tank 118 filled with alkali ion water 116. Hydrocarbon-based particles are eliminated in the alkali cleaning process. In the present embodiment, the pH of the alkali ion water is set to be 10 to 13, and the dissolved air is set to be equal to or lower than 2 to 5%. Such a setting is advantageous from the standpoint of effective elimination of the hydrocarbon-based particles. In the present embodiment, a pump 122 that suctions the alkali ion water 116 is provided at an end L that is the IN side of the alkali cleaning tank 118. Foreign substances like particles suspended in the alkali ion water 116 suctioned by the pump 122 are trapped by an unillustrated filter, and the alkali ion water 116 is discharged from a discharging nozzle 124 provided at an end R that is the OUT side of the alkali cleaning tank 118. Through such a cleaning process, a water stream is generated in the alkali cleaning tank 118 from the OUT side to the IN side that is an opposite direction to the convey direction of the base member 12. Accordingly, particles once eliminated from the vicinity of the base member 12 are repelled from the base member 12 by the water stream in the opposite direction to the convey direction of the base member 12, and are trapped by the filter. As a result, the possibility of re-adhesion of the particles in alkali ultrasound cleaning can be decreased. Moreover, the particles can be eliminated efficiently by the cleaning liquid having a cleanness level always high through the purification treatment.

In the present embodiment, the base member 12 having undergone the alkali cleaning process 104 is conveyed to a first pure water cleaning tank 126 filled with pure water 128 for executing the first pure water cleaning process 106. In the first pure water cleaning process 106, ultrasound of at least two kinds of frequencies is used in order to perform pure water ultrasound cleaning. For example, in the present embodiment, an ultrasound generator 130 that generates ultrasound of a frequency of 40 kHz, an ultrasound generator 132 that generates ultrasound of an intermediate frequency of 68 kHz, and an ultrasound generator 134 that generates ultrasound of a high frequency of 132 kHz are arranged in this order from the cleaning start side in the first pure water cleaning tank 126. Multi-stage pure water ultrasound cleaning with a frequency becoming higher toward the cleaning end side is executed in this fashion. It is advantageous in that uniform cleaning can be performed. Also in the first pure water cleaning process 106, a pump 136 that suctions the pure water 128 is provided at an end L that is the IN side of the first pure water cleaning tank 126. Foreign substances like particles suspended in the pure water 128 suctioned by the pump 136 are trapped by an unillustrated filter, and the pure water 128 is discharged from a discharging nozzle 138 provided at an end R that is the OUT side of the first pure water cleaning tank 126. In this case, the same effect as that of the alkali cleaning tank 118 can be obtained. That is, suppressing of re-adhesion of the particles to the base member 12 and improvement of the cleanness level through the purification treatment are enabled, and thus an effective particle elimination process can be carried out.

The base member 12 having undergone the first pure water cleaning process 106 is conveyed to the second pure water cleaning process 108. In the second pure water cleaning process 108, intensive jet of pure water is applied to the base member 12 in order to clean and eliminate remaining particles. It is advantageous from the standpoint of further reduction of the varying of cleaning. A jet cleaning nozzle 142 is arranged at the bottom of a second pure water cleaning tank 140, and remaining particles on the base member 12 are cleaned and eliminated by water stream produced by such jet of pure water. Intensive water stream is produced thus way and acting force is successively applied to the surface of the base member 12, thereby re-removing, in the second pure water cleaning tank 140, the particles not eliminated and left through the ultrasound cleaning of the first pure water cleaning process 106 and the particles re-adhered while the base member 12 is being moved in the first pure water cleaning tank 126. Note that pumps 144 that suction the pure water 128 are provided at an end L that is the IN side of the second pure water cleaning tank 140 and at an end R that is the OUT side thereof. Foreign substances like the suspended particles are trapped by an unillustrated filter from the pure water 128 suctioned by those pumps 144 and the pure water 128 is discharged from the jet cleaning nozzle 142. Through this purification treatment, a water stream indicated by a dashed arrow and from the center of the second pure water cleaning tank 140 to the IN side and the OUT side is generated. As a result, the particles removed from the base member 12 by jet stream are moved in a direction apart from the base member 12 by the water stream by the purification treatment. Therefore, the possibility that the particles once eliminated from the base member 12 re-adhere can be decreased. Moreover, the jet stream from the jet cleaning nozzle 142 becomes the clean pure water 128 having the particles eliminated, and thus the cleaning efficiency improves.

In the process diagram of FIG. 7, the base member 12 having undergone the second pure water cleaning process 108 is conveyed to the spray cleaning process 110. In the spray cleaning process 110, a mixture 148 of pure water and air is sprayed to the base member 12 from a spray nozzle 146 provided therearound in order to execute spray cleaning. By mixing the pure water with air, the pure water becomes minute grains and by spraying such minute grains, large kinetic energy can be applied. In the present embodiment, the inventors of the present invention obtained a test result that when the diameter of the pure water grain is set to be 20 to 80 μm, and the spraying speed is set to be 20 to 80 m/s in order to execute the spray cleaning process 110, a requisite level can be ensured regarding the TA failure occurring rate of the rotating device 10.

The base member 12 having undergone the spray cleaning process 110 is conveyed to the water repelling process 112. In the water repelling process 112, clean air 152 is blown to the base member 12 from an air nozzle 150, thereby repelling water. In the water repelling process 112, the base member 12 may be rotated or slid, resulting in a further effective water repelling.

The base member 12 having undergone the water repelling process 112 is conveyed to the drying process 114. In the drying process 114, the whole base member 12 is dried using hot air and a near-infrared heater 154. In the drying process 114, the base member 12 may be rotated or slid, resulting in a further effective drying.

The first machining process 401, the second machining process 403, the air spraying process 404, the liquid spraying process 405 and the cleaning process 406 can be executed through a so-called batch scheme that executes respective processes independently. However, it is typical for such a batch-scheme manufacturing method to store intermediate products before and after each process. If the intermediate product is once stored, it may be scratched or foreign substances may adhere thereto during such a procedure. Hence, it is desirable that the base member 12 should be successively but individually conveyed in the first machining process 401, the second machining process 403, the air spraying process 404, the liquid spraying process 405, and the cleaning process 406.

When the first machining process 401, the second machining process 403, the air spraying process 404, the liquid spraying process 405, and the cleaning process 406 are provided like a straight line, the process length becomes long and the arrangement in a factory may become difficult. Accordingly, the first machining process 401, the second machining process 403, the air spraying process 404, the liquid spraying process 405, and the cleaning process 406 may be successively carried out while being turned down in the halfway thereof while the base members 12 are individually conveyed therethrough. As a result, the arrangement in the factory becomes easy.

Next, an explanation will be given of an airtightness measuring process 407.

The base member 12 having undergone the drying process 114 is conveyed to the airtightness measuring process 407. In the case of FIG. 7, it is desirable that the airtightness measuring process 407 should be executed at the work-area-200 side where substantially no particle suspending in the air is present. However, depending on the process designing, the airtightness measuring process 407 can be executed at the work-area-100 side.

The base member 12 cannot ensure a sufficient airtightness in some cases between the upper face and the bottom face depending on the material and the machining failure. Hence, according to the manufacturing method of the rotating device 10 of the present embodiment, the airtightness measuring process 407 is provided between the cleaning process 406 and the assembling process 408. The airtightness measuring process 407 can be carried out using, for example, a pressure chamber. In the base member 12, a gas with a higher pressure than atmosphere, e.g., a helium gas is filled in a space containing a first face side where the hub member 26 is provided. Next, pressure reduction speed of the pressurized space while a predetermined time elapses is measured, thereby executing the airtightness measuring process 407. At this time, the bearing hole 12b and the tap hole 12d are plugged by a plugging member. Thus, at a stage before the base member 12 is assembled as the rotating device 10, an abnormal product having a faster reduction speed than the upper limit of the reduction speed set beforehand is eliminated, so that the number of products out of the standard can be relatively reduced, thereby improving the work efficiency.

Next, an explanation will be given of the assembling process 408.

The base member 12 having undergone the airtightness measuring process 407 is conveyed to the assembling process 408. In the assembling process 408, the base member 12 after the cleaning is assembled with the bearing unit 30, the fixing body portion S and the rotating body portion R, and the rotating device 10 having only the components for rotating and driving the recording disk 20 is manufactured. At this time, the work area 200 where the assembling process 408 is executed is a positive pressure, entrance of particles from the exterior is suppressed, and the assembling can be carried out at a high cleanness level. Subsequently, the recording disk 20 is mounted on the hub member 26, the magnetic head 24, the swing arm 22, the arm bearing unit 16, the voice coil motor 18, the control circuit and other necessary components are assembled, thereby completing the assembling of the rotating device 10. The final assembling of the recording disk 20, etc., can be carried out in the assembling process 408 or may be carried out in another clean room at a predetermined cleanness level.

As shown in FIG. 7, the assembling process 408 may be executed successively with the cleaning process 406. Moreover, the first machining process 401, the second machining process 403, the blowing process (the air spraying process 404 and the liquid spraying process 405), the cleaning process 406, and the assembling process 408 may be successively executed while the base members 12 are individually conveyed therethrough. Furthermore, the first moistening process 402, the second moistening process, the airtightness measuring process 407, and the like may be executed successively while the base members 12 are individually conveyed therethrough. As a result, various problems brought by storing of the base member 12 can be reduced.

Figure 10:
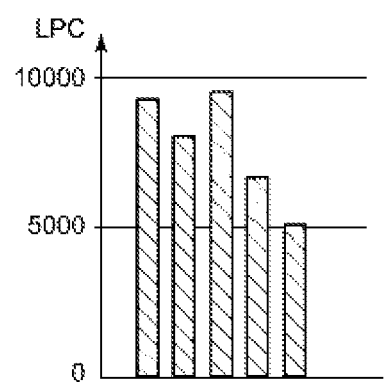
FIG. 10 is an explanatory diagram of an LPC of a rotating device manufactured through a conventional manufacturing method.
Figure 11:
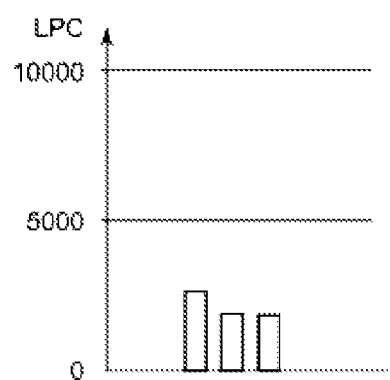
FIG. 11 is an explanatory diagram of an LPC of a rotating device manufactured through the manufacturing method according to the embodiment.

FIG. 10 shows an LPC indicating the number of particles having a size of equal to or greater than 0.5 μm per 1 $cm^2$ on the base member which is manufactured through the manufacturing method of the related art and which is assembled with the bearing unit 30 and the rotating body R. The cleanness levels LPC on five test samples vary in a range from 5000 to 10000 particles, and it is clear that reduction of the number of particles to be equal to or less than 8000 particles is difficult. Conversely, FIG. 11 shows an LPC of the rotating device 10 having the base member 12 which is manufactured through the manufacturing method of the present embodiment shown in FIG. 4 and which is assembled with the bearing unit 30 and the rotating body R. In this case, regarding the three test samples which are the rotating devices, a result that the LPC indicating the number of particles having a size of equal to or greater than 0.5 μm per 1 $cm^2$ is roughly reduced to be equal to or less than 2000 particles, and the varying in the LPC is small is obtained.

As explained above, in the case of the rotating devices obtained through the manufacturing method of the related art having the LPC in a range from 5000 to 10000, the number of particles per device varies largely. Accordingly, it is necessary to check the particles in the inspection process of the rotating device, and when the rotating device having the large number of particles is found, it cannot be directly shipped as it is. In this case, for example, a particular process of eliminating the particles, e.g., wiping the particles is added, and thus the laboring effort in the manufacturing process increases. Moreover, in this case, the rotational speed of the disk is set to be slowed down in order to decrease the probability of a TA failure, and the speed of data reading becomes slow. In contrast, in the case of the rotating device 10 manufactured through the manufacturing method of the present embodiment, the LPC can be reduced to be equal to or less than 2000 particles. That is, the varying in the number of particles per device can be small. As a result, it becomes unnecessary to add a particular process of eliminating the particles, and thus the laboring effort can be reduced. Moreover, it also becomes unnecessary to set the rotational speed of the disk to be slow, and thus a high-performance rotating device 10 can be supplied.

In the above-explained manufacturing method of the rotating device 10, by adjusting the moving speed of the base member 12 and thus by extending the cleaning time, the LPC of the rotating device 10 can be equal to or less than 1500 particles. Moreover, the LPC of the rotating device can be equal to or less than 1000 particles through the same scheme. It is desirable that such a control of the LPC value should be adjusted so as to increase the efficiency based on a comparison between the number of processes and the work efficiency necessary for controlling the LPC value and those necessary for eliminating the particles.

In the above-explained embodiment, the explanation was given of the shaft-rotating type rotating device 10 as an example rotating device 10. However, the present invention can be applied to the manufacturing of the rotating device with other configurations, such as a shaft-fixed type rotating device, and the same effect as that of the above-explained embodiment can be obtained.

The present invention is not limited to the above-explained embodiment, and can be changed and modified in various forms based on the knowledge of those skilled in the art. The configuration shown in each figure is merely for explaining an example, and can be changed and modified as needed as long as it can accomplish the same function, and in this case, the same effect can be obtained.

Although the present invention was explained based on the embodiment, the embodiment is for explaining the principle and application of the present invention, and it should be understood that the embodiment can include various modifications and changes in the arrangement without departing from the scope and spirit of the present invention defined by appended claims.

For example, in a first modified example, the blowing process is executed by spraying air or pure water to the base member 12 while the base member 12 is relatively swayed to the spray nozzle or the liquid spray nozzle. Since the angle of spraying the air or the pure water changes, the machining residue can be efficiently eliminated. Moreover, in a second modified example, at least either one of the air spraying process 404 and the liquid spraying process 405 intermittently sprays air or pure water. Since the base member 12 receives impact depending on a change in the amount of sprayed air or pure water, the machining residue can be efficiently eliminated.

In the cleaning process 406, when the base member 12 moves while it is being cleaned, air bubbles may adhere to an end face of the base member opposite to the moving direction. The portion to which the air bubbles adhere decreases the action of ultrasound, which highly possibly generates a fluctuation in elimination of the particles. Accordingly, in a third modified example, in the cleaning process 406, a water stream is added which eliminates air bubbles adhered to the periphery of the base member 12 moving in the cleaning liquid. More specifically, at least either one of the first pure water cleaning process 106 and the second pure water cleaning process 108 is executed with water stream that flows from the bottom to the top on a surface of the base member 12 moving in the cleaning liquid opposite to the moving direction. This reduces a fluctuation in elimination of the particles.

What is claimed is:

1. A method of manufacturing a rotating device that includes a base member in which a bearing hole and a tap hole are to be formed, a bearing unit to be inserted in the bearing hole, and a rotating body to be supported by the bearing unit, the method comprising:
a first machining process of machining the bearing hole while supplying a first cutting lubricant to the base member;
a second machining process of machining the tap hole while supplying a second cutting lubricant to the base member, the second machining process being continuous from the first machining process;
a blowing process of blowing at least one of the bearing hole and the tap hole with a fluid in order to eliminate a machining residue;
a cleaning process of cleaning the base member; and
an assembling process of assembling the base member with the bearing unit and the rotating body;
wherein the first machining process machines the bearing hole while the base member is individually retained in a container and is conveyed.

2. The method according to claim 1, wherein the second machining process machines the tap hole while the base member is individually conveyed.

3. The method according to claim 1, wherein the second machining process is executed while a moistening of the first cutting lubricant adhered to the base member after a machining through the first machining process is equal to or higher than a predetermined reference value.

4. The method according to claim 1, further comprising a moistening process of increasing at least one of a moistening of the first cutting lubricant adhered to the base member after a machining through the first machining process and a moistening of the second cutting lubricant adhered to the base member after a machining through the second machining process.

5. The method according to claim 1, wherein the blowing process blows a fluid in different directions from a plurality of nozzles.

6. The method according to claim 1, wherein in the cleaning process, cleaning is carried out with a plurality of base members being mounted on respective support tables attached to a conveyance mechanism at a predetermined interval.

7. The method according to claim 6, wherein each of the respective support tables is provided with a bridge portion forming a space between an inner bottom face of the support table and a supported face of the base member at a location avoiding one of the bearing hole and the tap hole to be formed with the base member being mounted on the support table.

8. The method according to claim 1, wherein the first machining process, the second machining process, the blowing process, and the cleaning process are successively carried out while the base member is individually conveyed therethrough.

9. The method according to claim 1, further comprising an airtightness measuring process of inspecting an airtightness of the base member after the cleaning process, wherein the airtightness measuring process is executed in a same area as an area of one of the cleaning process and the assembling process.

10. A method of manufacturing a rotating device that includes a base member in which a bearing hole and a tap hole are to be formed, a bearing unit to be inserted in the bearing hole, and a rotating body to be supported by the bearing unit, the method comprising:
- a first machining process of machining the bearing hole while supplying a first cutting lubricant to the base member;
- a second machining process of machining the tap hole while supplying a second cutting lubricant to the base member, the second machining process being continuous from the first machining process;
- a blowing process of blowing at least one of the bearing hole and the tap hole with a fluid in order to eliminate a machining residue;
- a cleaning process of cleaning the base member; and
- an assembling process of assembling the base member with the bearing unit and the rotating body;
- wherein the second machining process is executed while a moistening of the first cutting lubricant adhered to the base member after a machining through the first machining process is equal to or higher than a predetermined reference value.

11. The method according to claim 10, wherein the second machining process machines the tap hole while the base member is individually conveyed.

12. The method according to claim 10, further comprising a moistening process of increasing at least one of a moistening of the first cutting lubricant adhered to the base member after a machining through the first machining process and a moistening of the second cutting lubricant adhered to the base member after a machining through the second machining process.

13. The method according to claim 10, wherein the blowing process blows a fluid in different directions from a plurality of nozzles.

14. The method according to claim 10, wherein in the cleaning process, cleaning is carried out with a plurality of base members being mounted on respective support tables attached to a conveyance mechanism at a predetermined interval.

15. The method according to claim 10, wherein the second machining process is executed within ten minutes after a machining through the first machining process.

16. A method of manufacturing a rotating device that includes a base member in which a bearing hole and a tap hole are to be formed, a bearing unit to be inserted in the bearing hole, and a rotating body to be supported by the bearing unit, the method comprising:
- a first machining process of machining the bearing hole while supplying a first cutting lubricant to the base member;
- a second machining process of machining the tap hole while supplying a second cutting lubricant to the base member, the second machining process being continuous from the first machining process;
- a moistening process of increasing at least one of a moistening of the first cutting lubricant adhered to the base member after a machining through the first machining process and a moistening of the second cutting lubricant adhered to the base member after a machining through the second machining process;
- a blowing process of blowing at least one of the bearing hole and the tap hole with a fluid in order to eliminate a machining residue;
- a cleaning process of cleaning the base member; and
- an assembling process of assembling the base member with the bearing unit and the rotating body.

17. The method according to claim 16, wherein the second machining process machines the tap hole while the base member is individually conveyed.

18. The method according to claim 16, wherein the blowing process blows a fluid in different directions from a plurality of nozzles.

19. The method according to claim 16, wherein in the cleaning process, cleaning is carried out with a plurality of base members being mounted on respective support tables attached to a conveyance mechanism at a predetermined interval.

20. The method according to claim 16, wherein the first machining process, the second machining process, the blowing process, and the cleaning process are successively carried out while the base member is individually conveyed therethrough.

* * * * *